United States Patent
Araujo et al.

[11] Patent Number: 6,108,350
[45] Date of Patent: Aug. 22, 2000

[54] METHOD AND APPARATUS FOR DETECTING THE PROTOCOL USED BY AN END STATION AND NEGOTIATING A PROTOCOL USED BY THE ENDPOINT

[75] Inventors: Kenneth Araujo, Sunnyvale; Ismail Dalgic, Mountain View; Peter Si-Sheng Wang, Cupertino, all of Calif.

[73] Assignee: 3Com Corporation, Santa Clara, Calif.

[21] Appl. No.: 09/038,711

[22] Filed: Mar. 9, 1998

[51] Int. Cl.[7] .................................................. H04J 3/16
[52] U.S. Cl. ........................ 370/467; 370/359; 370/419; 370/437; 370/465
[58] Field of Search ................................... 370/466, 359, 370/419, 437, 463, 465, 467, 469; 709/250; 379/399, 93.06, 93.15

[56] References Cited

U.S. PATENT DOCUMENTS

| | | | |
|---|---|---|---|
| 5,142,528 | 8/1992 | Kobayashi et al. | 370/469 |
| 5,541,911 | 7/1996 | Nilakantan et al. | 370/422 |
| 5,581,558 | 12/1996 | Horney, II et al. | 370/401 |
| 5,666,359 | 9/1997 | Bennett et al. | 370/358 |
| 5,666,362 | 9/1997 | Chen et al. | 370/420 |
| 5,666,487 | 9/1997 | Goodman et al. | 709/246 |
| 5,826,017 | 10/1998 | Holzmann | 709/230 |
| 5,878,045 | 3/1999 | Timbs | 370/466 |
| 5,943,481 | 8/1999 | Wakeland | 370/466 |

*Primary Examiner*—Hassan Kizou
*Assistant Examiner*—Mitchell Slavitt
*Attorney, Agent, or Firm*—David J. Weitz; Wilson Sonsini Goodrich & Rosati

[57] ABSTRACT

Method for improved configuration of a link between an end station and an intermediate device in a network. The intermediate device communicates through the link using a point-to-point protocol, and a lower layer protocol and is capable of translating between the lower layer protocol used by the link and a lower layer protocol used by a portion of the network. The intermediate device detects the lower layer protocol used by the end station and configures the link to use the point-to-point protocol, the lower layer protocol used by the end station, and an asymmetric digital subscriber line (ADSL) protocol. A method including signaling the end station to use on the link a lower layer protocol having a particular relationship with the lower layer protocol used by the portion of the network. The particular relationship, according to an aspect of the invention, is that the protocol that the end station is signaled to use is the same as the protocol used by the portion of the network thereby creating efficiencies in transmission from the end station through the intermediate device onto the network.

90 Claims, 8 Drawing Sheets

METHOD AND APPARATUS FOR DETECTING THE PROTOCOL USED BY AN END STATION AND NEGOTIATING A PROTOCOL USED BY THE ENDPOINT

BACKGROUND

1. Field of the Invention

The present invention relates to data communications, and more particularly to techniques of improving the configuration of the link between an end station and an intermediate device.

2. Description of the Related Art

Telephone subscribers are using the local loop for data communication in addition to voice. The local loop connects a telephone subscriber's customer premises equipment to the central office equipment at the network service provider. At the central office, the connection is routed to its destination, either directly or through other equipment in the network. New technologies are being employed to increase the bandwidth available over the local loop to allow subscribers, for example, to receive multimedia information on the Internet and the World Wide Web. One such technology is the xDSL family of technologies. xDSL are point-to-point public network access technologies that allow the transport of data, voice, and video over existing twisted-pair copper wire on the local loop between the subscriber and the network service provider. Asymmetric digital subscriber link (ADSL) is one such technology. In ADSL the transmission is asymmetric, allowing more transmission downstream from the network service provider to the subscriber than upstream from the customer to the network service provider. Thus, ADSL is advantageous for Internet use, video-on-demand, and remote local area (LAN) access, which typically require more transmission downstream (e.g., video images), than upstream (e.g., mouse click).

One protocol that may be used for transmission over the link is the point-to-point protocol (PPP). One version of the PPP is described in request for comments (RFC) 1661, published July 1994 by the Point-to-Point Protocol Working Group of the Internet Engineering Task Force. The communication over a link is specified by different protocols operating at different layers. ADSL is a lower layer protocol (at the physical layer) that may be used in conjunction with PPP. Other protocols, such as asynchronous transfer mode (ATM) or high level data link control (HDLC) may be used in a layer below the PPP and above the ADSL. So called HDLC-like framing is described in the RFC 1662 published July 1994 by the Point-to-Point Protocol Working Group of the Internet Engineering Task Force.

The point-to-point protocol, as it is defined, is used for transporting multi-protocol datagrams over point-to-point links. It consists of a specification for encapsulating multi-protocol datagrams, a link control protocol (LCP) for establishing, configuring and testing the datalink connection, and a family of network control protocols (NCPs) for establishing and configuring different network layer protocols. According to the PPP, network layer packets are referred to as datagrams. The datagrams are passed to the datalink layer in which they are encapsulated according to the point-to-point protocol in a packet having a packet header. The packet including the point-to-point protocol fields and the datagram is passed to a lower layer at which framing such as HDLC-like framing is appended to form a frame, the format received at the physical layer interface. Upon reception, the frame is stripped of its framing fields, and a packet is passed to the datalink layer. The packet is stripped of its control fields to produce a datagram. The datagram is passed to the network layer at which network layer headers and the like are processed.

PPP sessions are established between peers. In one typical environment, the peers include customer premises equipment, and a remote access server RAS operated by an Internet service provider ISP. The subscriber dials a telephone number to access the RAS of the Internet service provider. The PPP is utilized to establish the peer to peer connection from the customer premises equipment to the RAS.

Establishing a link over the local loop for use in PPP communications requires configuring the connection between the customer premises equipment and the central office according to common protocols. With information regarding the protocols used by the customer premises equipment, a craftsperson at the central office may configure the central office equipment accordingly. A craftsperson's time is expensive, and use of human intervention to configure the link may be subject to error. Additionally, after configuration, the subscriber may change to equipment using different protocols, thus making the current configuration inoperative.

As data traffic increases, the network service providers are logically or physically diverting the data traffic off of the voice networks into backbone networks more suited for data traffic or packet switched traffic. Thus, the central office switches are configured with a concentrator and multiplexer for data traffic which is split off of the voice traffic. Network service providers are beginning to deploy equipment that diverts calls destined for Internet service providers off of the voice switching network on to a dedicated backbone network for data transmission. This equipment terminates calls, extracts PPP data and encapsulates the data (for example, within logical connections in a tunnel). The tunnels refer to communication channels which operate according to tunneling protocols including the point-to-point tunneling protocol PPTP, the layer 2 forwarding protocol L2F, and a layer 2 tunneling protocol L2TP. These tunnels use the network service providers' backbone networks for connection to different Internet service providers. The logical connections within a tunnel are used as a means for multiplexing the data from several users into a single tunnel. In addition to tunneling, a variety of other techniques are utilized by the network service providers to manage the flow of data through their networks.

Lower layer protocols used on the link between the subscriber and the central office may be different from those used in the backbone network. For example, a link may be established between the customer premises equipment and the central office, where the link uses PPP, FUNI, and ADSL. The central office equipment may forward the call over a backbone network that uses ATM, a cell-based protocol, instead of being frame-based (frame-relay, for example). In order to forward the call over the cell-based backbone, the central office equipment will need to segment the FUNI frames into cells and transmit them via the ATM network. Such conversions may need to happen several times in the end-to-end data path.

SUMMARY OF THE INVENTION

The present invention provides a method of automatically configuring a link between an end station and an intermediate device that is coupled to a portion of a network. One embodiment involves automatically determining the protocol used by the end station thus making configuration relatively easy. Another embodiment involves negotiating with the end station to use a protocol that has a particular relationship with the protocol used by the portion of the network. One advantage of choosing a protocol having a particular relation is that the protocol can be chosen to bring about efficiencies in transmission over the link and through the backbone network.

According to one embodiment, the intermediate device communicates through the link using a lower layer protocol and is capable of translating between the lower layer protocol used by the link and a lower layer protocol used by a portion of the network. The intermediate device detects the lower layer protocol used by the end station and negotiates with the end station, if possible, to use a lower level protocol that is consistent with the transfer between the intermediate device and the next hop for the data.

According to an aspect of the invention, the lower layer protocol used by the end station is detected by determining that the end station uses a particular lower layer protocol if a bit stream received from the end station includes a transmission encoded according to the particular lower layer protocol for a particular period. For example, if a particular number of ATM cells are received from the end station, the intermediate device determines that the lower layer protocol used by the end station is an ATM protocol. Alternatively, if a particular number of high level data link control (HDLC) frames are received from the end station, the intermediate device determines that the lower layer protocol used by the end station is a frame-based protocol.

In another alternative the intermediate device sends to the end station a transmission formatted according to a particular lower layer protocol. Then, the intermediate device detects the lower layer protocol used by the end station by observing the response or lack of response from the end station. If a valid response is received in the particular lower layer protocol, the intermediate device may conclude that the end station is using the particular lower layer protocol. If a valid response is not received in the particular lower layer protocol, the intermediate device concludes that the end station is not using the particular lower layer protocol.

According to another aspect of the invention, after detecting the lower layer protocol used by the end station, the intermediate device sends to the end station a transmission formatted according to a particular lower layer protocol to further determine the lower layer protocol used by the end station. For example, a transmission may be received from the end station that indicates that the end station is using a frame-based protocol. The intermediate device sends a transmission according to a particular frame-based protocol, such as FUNI, in order to determine the particular type of frame-based protocol used by the end station. The transmission may comprise, for example, Q.921 SABME frames.

With a method of automatically configuring a link, an aspect of the invention improves transmission over a link and a portion of a network that may otherwise use different protocols. The end station communicates with the portion of the network using a point-to-point protocol over a link between the end station and an intermediate device. The intermediate device is capable of translating between a lower layer protocol initially used by the end station and a lower layer protocol used in a portion of a network coupled to the intermediate device. The method includes signaling the end station to use on the link a lower layer protocol having a particular relationship with the lower layer protocol used by the portion of the network. If the end station changes to the lower layer protocol having the particular relationship with the lower layer protocol used by the portion of the network, then the intermediate device uses on the link the lower layer protocol having the particular relationship with the lower layer protocol used by the portion of the network. If the end station does not change to the lower layer protocol having the particular relationship with the lower layer protocol used by the portion of the network, then the intermediate device uses on the link the lower layer protocol initially used by the end station.

According to one aspect of the invention, the particular relationship is that the lower layer protocol that the end station is signaled to use on the link is the same as the lower layer protocol used by the portion of a network.

According to another aspect of the invention, the lower layer protocol having the particular relationship with the lower layer protocol used by the portion of the network comprises a protocol that improves transmission efficiency from the end station through the portion of the network relative to transmission efficiency using on the link the lower layer protocol initially used by the end station. The efficiency is achieved, for example, by reducing reformatting of data at the intermediate device.

According to an aspect of the invention the signaling comprises the intermediate device sending to the end station a transmission formatted according to the lower layer protocol having a particular relationship with the lower layer protocol used by the portion of a network.

According to another aspect of the invention, the lower layer protocol initially used by the end station comprises a frame-based protocol, and the protocol used by the portion of a network comprises a cell-based protocol. According to another aspect of the invention, the lower layer protocol having the particular relationship with the lower layer protocol used by the portion of the network comprises a cell-based protocol. An advantage of such an automatic configuration is that data formatted at the end station according to cell-based protocol may be more efficiently transmitted over the portion of the network that uses a cell-based protocol than data formatted according to a frame-based protocol.

According to another aspect of the invention, the lower layer protocol initially used by the end station comprises a frame based user to network interface (FUNI) protocol, and the protocol used by the portion of a network comprises an asynchronous transfer mode (ATM) protocol. According to this aspect of the invention, the lower layer protocol having the particular relationship with the lower layer protocol used by the portion of the network comprises an ATM protocol.

DETAILED DESCRIPTION

Figure 1A:
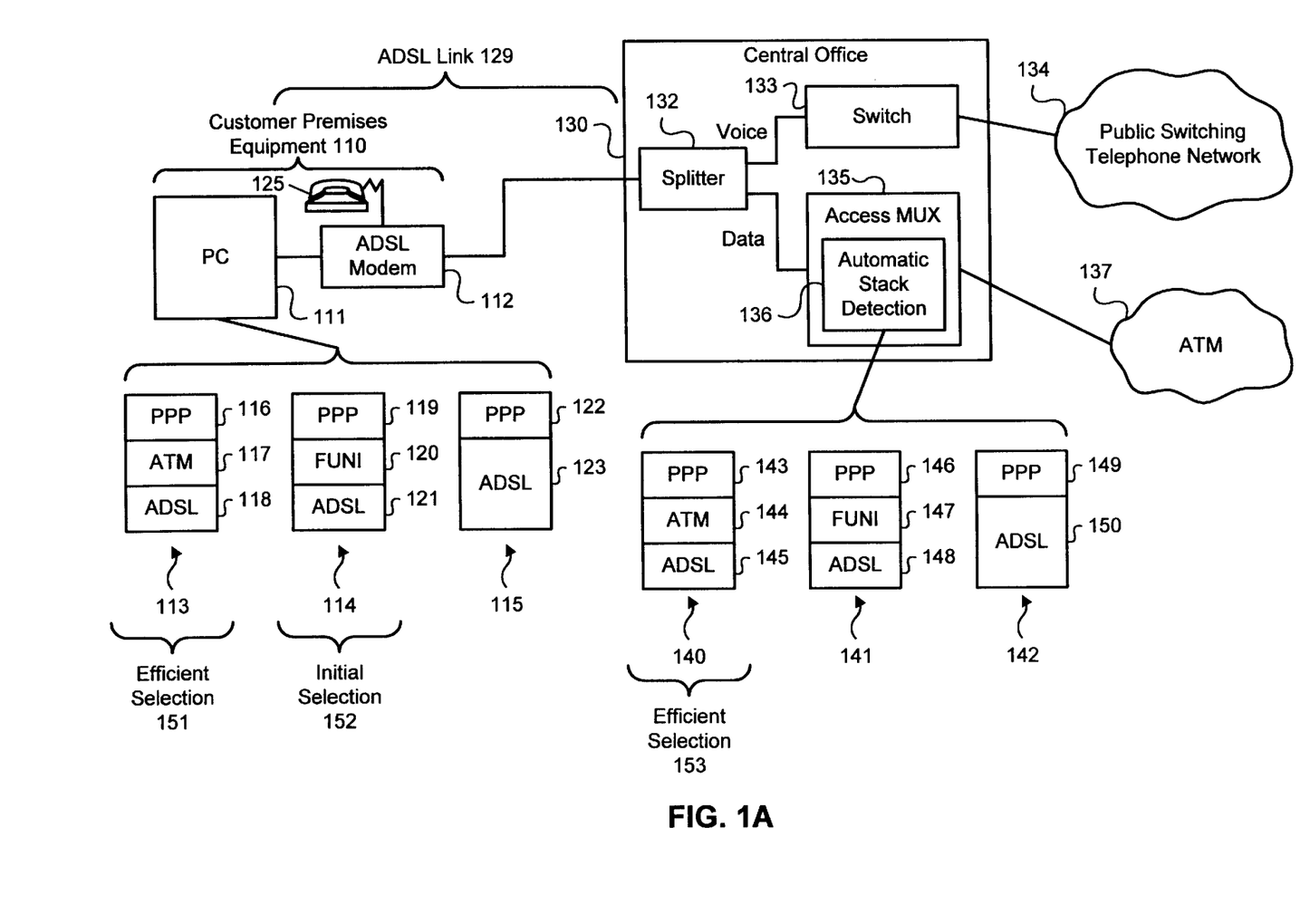
FIG. 1(a) is a simplified diagram illustrating an example network environment in which a link according to an embodiment of the present invention is implemented.

A detailed description of examples of the present invention is provided with reference to the figures, in which FIG. 1 illustrates a context in which the present invention is used.

The present invention provided methods for detecting a protocol used on a link and for automatically configuring the link. For example, to help avoid requiring a craftsperson to configure each link between a subscriber and the central office, the invention includes a method for automatically determining a protocol used by the customer premises equipment. This information can then be used to automatically configure the link to use the protocol used by the customer premises equipment. The invention also includes the method for configuring the link by negotiating between the customer premises equipment and the central office such that a protocol is used on the link that helps to provide efficient transmission over the link and through a backbone network coupled to the central office. For example, if the customer premises equipment initially uses a frame-based protocol and the backbone network coupled to the central office uses a cell-based protocol, then the central office equipment negotiates with the customer premises equipment to use a cell-based protocol over the link. The use of the same or related protocol over the link as on the backbone network helps to improve the efficiency of transmission over the link and the backbone network by reducing the amount of computation required at the central office to translate between protocols.

FIG. 1(a) is a simplified diagram illustrating an example network environment in which a link according to an embodiment of the present invention is implemented. The network in the FIG. 1(a) includes customer premises equipment 110, which includes a personal computer 111, and an ADSL modem 112. Personal computer is coupled to ADSL link 129 through ADSL modem 112. Telephone 125 is also coupled to ADSL link 129. Initially, personal computer 111 is using one of three protocol stacks 113, 114, and 115. Protocol stack 113, which is an example of a cell-based protocol stack, includes a point-to-point protocol 116 layer, an ATM layer in 117, and an ADSL layer 118, in that order from top to bottom. Protocol stack 114, which is an example of a frame-based protocol stack, includes a PPP layer 119, a FUNI layer 120, and an ADSL layer at 121 in that order. Protocol stack 115, which is also an example of a frame-based protocol stack, includes a PPP layer 122 and an ADSL layer 123 in that order. Protocol stack 115 includes an HDLC protocol and does not include a FUNI protocol. (FUNI is an extension of the HDLC protocol.)

ADSL link 129 is established between customer premises equipment 110 and central office 130. Central office 130 includes a splitter 132, a switch 133, and an access multiplexer 135. (Note—the splitter function could be integrated in the line card of the access multiplexer. Then, a separate interface from the access multiplexer could interface with the voice networks potentially transporting multiple voice streams to this network.) The access multiplexer 135 includes an automatic stack determination module 136. The access multiplexer at 135 is coupled to an ATM backbone network 137. Switch 133 is coupled to a public switching telephone network 134. Access multiplexer 135 is capable of running at least one of three different protocol stacks. For example, protocol stack 140, 141, and 142. Protocol stack 140 includes a PPP layer 143, a ATM layer 144, and an ADSL layer 145, and is an example of a cell-based protocol stack. Protocol stack 141 includes a PPP layer 146, a FUNI layer 147, an ADSL layer 148, and is an example of a frame-based protocol stack. Protocol stack 142 includes a PPP layer 149 and an ADSL layer 150, and is an example of a frame-based protocol stack.

Customer premises equipment 110 includes equipment which is used for voice communication and also data communication. Telephone 125 is used for voice communication over the ADSL link 129. Personal computer 111 is capable of data communication also over ADSL link 129 via ADSL modem 112. Both data and voice are transmitted over ADSL link 129 between customer premises equipment 110 and central office 130. At the central office 130, splitter 132 separates voice from data. Voice communication is transmitted through switch 133 and onto the public telephone switching network 134. Alternatively, if splitter 132 is integrated in access multiplexer 135, then voice is transmitted through access multiplexer 135. Data is transmitted through access multiplexer 135 and onto a backbone network for data 137.

The ADSL link 129 requires the use of common protocols for communication between customer premises equipment 110 and central office 130. A point to point (PPP) protocol is used as one of the upper layers on the link. Additional protocol layers are included in a complete stack defining the protocols used in the transmission, but are not shown in FIG. 1(a). For example, an IP protocol layer would typically be used for internet communication above the PPP layer. As shown in FIG. 1(a), initially personal computer 111 is using initial selection 152, which is protocol stack 114. Protocol stack 114 is a frame-based protocol stack. However, backbone network 137 is an ATM network, which is a cell-based protocol rather than a frame-based protocol. Thus, transmission over the link and through central office and through backbone network 137 may be possible, but may experience some inefficiencies because of the requirement of translation between a frame-based protocol and a cell-based protocol. Thus, an efficient selection is protocol stack 113 and 140. These protocols stacks 113 and 140 are ATM protocol stacks, which are cell-based, and which provide greater efficiency for transmission over the link and through the cell-based ATM backbone network 137. Thus, after detecting the initial selection 152, automatic stack determination module 136 signals customer premises equipment 110 to select efficient selection 151. Provided that customer premises equipment changes to efficient selection 151, the automatic stack determination module 136 uses efficient selection 153 on the ADSL link 129, thus causing the ADSL link 129 to use a protocol more compatible with backbone network 137.

Alternatively, if customer premises equipment 110 is not capable of changing protocol stacks, then automatic stack determination module 136 use the protocol stack that customer premises equipment 110 initially uses.

The automatic stack determination module 136 may detect the protocol stack used by the customer premises equipment 110 by receiving transmissions from customer premises equipment and determining whether the transmissions are formatted according to a cell-based protocol or a frame-based protocol. Further, automatic stack determination module 136 can observe the transmissions from customer premises equipment 110 to determine the particular type of cell-based protocol or frame-based protocol. According to another aspect of the invention, automatic stack determination module 136 sends a transmission to customer premises equipment 110. By observing the response to the transmission and determining in which protocol the response is formatted, the automatic stack determination module 136 detects the protocol used by customer premises equipment 110. Additionally, if no valid response is received to a transmission in a particular protocol, the automatic stack determination module 136 may determine that the particular protocol is not being used by customer premises equipment 110.

Customer premises equipment 110 is an example of an end station, and access multiplexer 135 is an example of an intermediate device. Backbone network 137 is a portion of a network. In other embodiments of the invention, other equipment is used as an end station and a central office. Other types of networks may be used.

Access multiplexer 135 includes a number of hardware cards each of which may support several ADSL links. The cards include a processor or processors that run software that controls modem hardware and provides other functionally to control ADSL link 129. Various combinations of hardware and software are possible in embodiments of the invention. A processor may be shared by various cards. Cards may support multiple links, or multiple cards may support a single link. Automatic stack determination module 136 comprises software running in central office—in some embodiments on a card or cards in access multiplexer 135. In other embodiments of the invention, automatic stack determination module 136 includes hardware or a combination of hardware and software. Automatic stack determination module 136 may support one link including one subscriber or multiple links with multiple subscribers. Multiple variations of automatic stack determination module 136 may run on access multiplexer 135 or elsewhere in central office 130 so as to support multiple links in according to different needs.

Figure 1B:
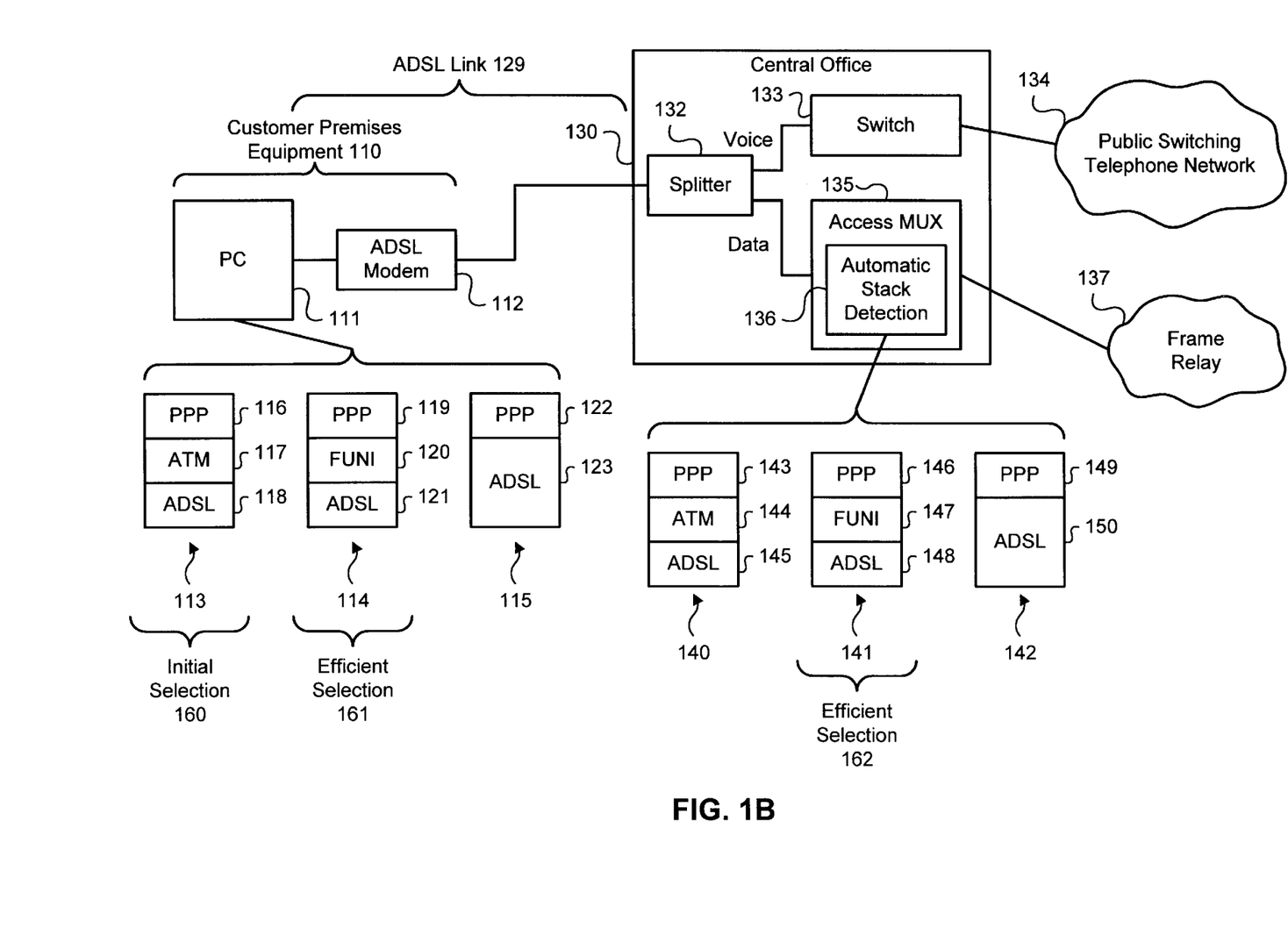
FIG. 1(b) is a simplified diagram illustrating an example network environment in which a link according to an embodiment of the present invention is implemented with a central office coupled to a frame-based network.

FIG. 1(*b*) is a simplified diagram illustrating an example network environment in which a link according to the present invention is implemented with a central office 130 coupled to a frame-based network. In FIG. 1(*b*) the backbone network 137 is a frame based network (for example, Frame Relay). Because the Frame Relay network 137 is a frame-based network, it is desirable for a frame-based protocol to be used over ADSL link 129. This means that it is desirable to switch from initial selection 160 to efficient selection 161. Thus, after signaling customer premises equipment 110 to switch from initial selection 160 to efficient selection 161, ADSL link 129 should use the frame-based protocol stacks 114 and 141. This allows for a frame-based protocol to be used both on the ADSL link 129 and in the backbone network 137.

In an alternative embodiment of the invention, the automatic stack determination module 136 detects the protocol initially used by customer premises equipment 110 and uses that protocol stack on the ADSL link 129. For example, in FIG. 1(*b*), although backbone network 137 is a frame-based network, the initial selection 160 is a cell-based protocol stack 113. Thus, in such an embodiment, the automatic stack determination module 136 detects initial selection 160 as an ATM protocol and uses an ATM protocol on the link, by using protocol stack 140.

Figure 2:
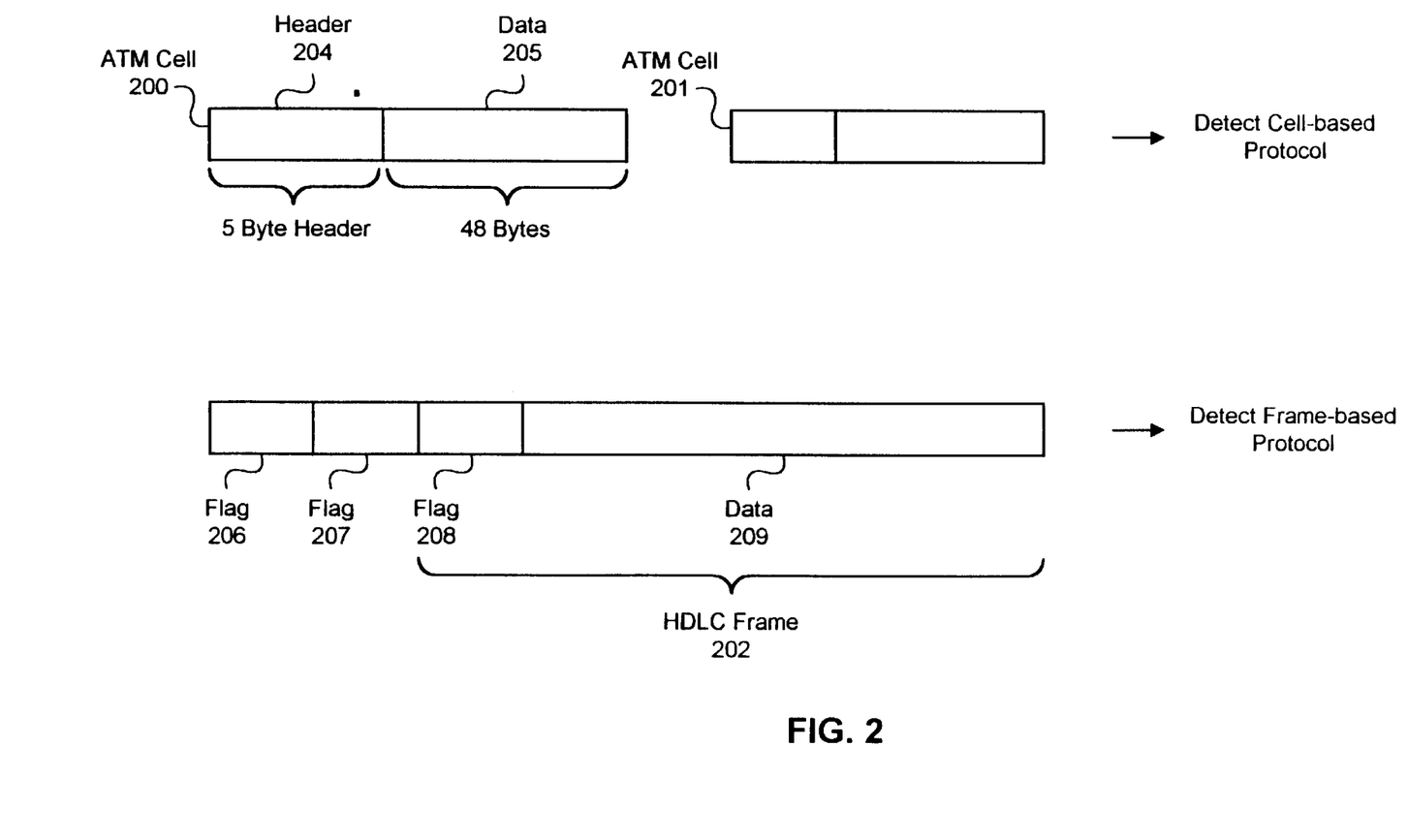
FIG. 2 is a simplified diagram of an ATM cell formatted according to an ATM protocol and an HDLC frame formatted according to an HDLC protocol.

FIG. 2 shows ATM cells and HDLC frames in a frame according to the present invention. ATM cell 200 includes a five byte header 204 and a 48 byte data portion 205. HDLC frame 202 includes a flag 208 and data 209. In the frame-based transmission, multiple flags 206, 207, and 208 may be sent before a data portion begins. The automatic stack determination module 136 analyzes the incoming bit stream from the ADSL link 129 to determine whether ATM cells or HDLC frames are present. A mathematical algorithm is performed on the incoming bit stream to determine whether the incoming bits constitute ATM cells. One method of determining whether the bits constitute ATM cells is to look for header error control (HEC) patterns within the bit stream. If the HEC patterns are present, then the automatic stack determination module 136 can conclude that the incoming bit stream include ATM cells. To determine whether the incoming bit stream is a HDLC frame-based transmission, the automatic stack determination module 136 looks for HDLC flags. Different types of HDLC frame-based stacks may be used, and to distinguish between the different types of stacks, the automatic stack determination module waits for a data portion 209 of the HDLC frame followed by flag 208. If the lowest order bit of the first non-flag byte is "0", then the automatic stack determination module 136 determines that the customer premises equipment is running the PPP-FUNI-ADSL stack. If the lowest order bit of the first non-flag byte is "1", then the automatic stack determination module 136 concludes that the customer premises equipment is running a PPP-ADSL stack. Other methods can also be used to distinguish between the different types of frame mode protocols.

A cell comprises a fixed-sized packet of data. In contrast, a frame comprises a packet of data that does not necessarily have a fixed size.

When observing the incoming bit stream from the customer premises equipment, the automatic stack determination module 136 checks for a particular number of ATM cells before concluding that the customer premises equipment is transmitting ATM cells. Likewise, the automatic stack determination module 136 first detects a particular number of HDLC flags before determining whether the customer premises equipment is transmitting a frame-based protocol.

In one embodiment of the invention, the automatic stack determination module detects from the bit stream from the customer premises equipment 110 the protocol stack running on the customer premises equipment 110. Then, based on this information, the automatic stack determination module 136 selects the same protocol stack that is initially used on the customer premises equipment 110. In another embodiment of the invention, the automatic stack determination module negotiates with the customer premises equipment 110 in order to select a protocol stack that helps to bring about efficiencies in transmission over the ADSL link 129 and through the backbone network 137 by choosing a protocol stack to be used on ADSL link 129 that has a protocol that has a particular relationship with the protocol used on the backbone network 137. This particular relationship may be that the protocol used on ADSL link 129 is such that efficiencies are realized in transmission over the ADSL link 129 and through the backbone network 137. For example, the particular relationship may be that the encapsulation used on ADSL link 129 is the same as the encapsulation used in the backbone network 137. Also, the particular relationship may be that other advantages are realized by a selection of the protocol over ADSL link 129. The ability to negotiate may not be supported by some customer premises equipment. Some customer premises equipment may support only one protocol stack and may not be negotiated away from that stack. Other customer premises equipment may support multiple protocol stacks. Some customer premises equipment may be capable of being negotiated away from the protocol it originally sends on the line. Thus, for example, even if customer premises equipment 110 supports both the PPP-ATM-ADSL stack and the PPP-FUNI-ADSL stack, and customer premises equipment 110 was originally sending framing in the latter, an attempt by automatic stack determination module 136 to make the customer premises equipment 110 change to the PPP-ATM-ADSL stack may be rejected by the customer premises equipment 110 since it is not willing to presently perform the extra processing required for converting to/from cells (the segmentation and reassembly function).

To determine which protocol stack is being used by the customer premises equipment, the automatic stack determination module 136 in central office 130 performs the following when the automatic stack determination module 136 detects that ADSL link 129 has been restarted or resynchronized:

1. Automatic stack determination module 136 looks for HDLC framing or ATM cells (using the standard header error control method) in the stream of bits received from customer premises equipment 110. An assumption is that the customer premises equipment 110, at the very least, transmits HDLC flags for the frame-based protocol stacks (PPP-ADSL or PPP-FUNI-ADSL) and idle or unassigned cells for the cell-based protocol stack (PPP-ATM-ADSL) when it is idle. Another assumption is that the ADSL link 129 is running in a bit synchronous mode whether it is transferring ATM or HDLC frames. Based on the receipt of some number of HDLC flags or some number of ATM cells within a period of time X, the automatic stack determination module 136 makes a conclusion as to whether the customer premises equipment 110 is running in frame mode (and supports either the PPP-ADSL or PPP-FUNI-ADSL stack) or it is running in cell mode (and supports the PPP-ATM-ADSL stack).

2. If the automatic stack determination module 136 determines that the customer premises equipment 110 was running in frame mode in the preceding step, it needs next to determine which particular frame mode from among two types of frame mode protocols is being run by the customer premises equipment 110. Note that the start of a message on a bit synchronous ADSL link running one of the frame protocols can be determined, for example, by finding a HDLC flag followed by a non-HDLC flag byte.

In one scheme, the automatic stack determination module 136 will wait until the customer premises equipment 110 wishes to initiate a transfer of outgoing data (determined as described in item 2 above), before the determination of which frame protocol stack customer premises equipment 110 uses can be made. For the PPP-FUNI-ADSL stack, this will usually happen immediately as a result of customer premises equipment 110 attempting to bring up the signaling protocols state machine (the customer premises equipment will transfer Q.921 frames associated with the data link of the signaling channel). When such a data frame is identified, automatic stack determination module 136 will look at the first byte following the HDLC flag byte. If the lowest order bit of this byte has a binary value of "0", then the automatic stack determination module 136 will conclude that the customer premises equipment 110 is running the PPP-FUNI-ADSL stack, as noted above in the description of the ATM cells and HDLC frames. If the lowest order bit of the byte has a binary value "1," then the automatic stack determination module 136 will conclude that the customer premises equipment 110 is running the PPP-ADSL stack.

In another scheme, the automatic stack determination module 136 proactively determines the frame protocol stack of customer premises equipment 110. In general, this is accomplished by transferring some message corresponding to a particular frame protocol stack to customer premises equipment 110 and waiting for a valid response to that message. If a valid response is not received after some number of retries, it may be assumed that the customer premises equipment 110 supports the second frame protocol stack. Optionally, some message from the other protocol stack can also be tried to double check that the automatic stack determination module 136 has correctly determined the frame protocol stack supported by the customer premises equipment 110.

The message sent to the customer premises equipment 110 to determine the frame protocol stack supported should meet the following criteria:

1. It should not result in problems with the customer premises equipment 110 if the customer premises equipment 110 is supporting the other frame protocol stack. Instead, the message should be discarded with no other ill effects in this case.

2. It should not adversely affect the operation of the carrier or the customer premises equipment protocol stack for those cases where the message is chosen from the correct protocol stack that is supported by the customer premises equipment 110. For example, a message should not be sent which would cause all subsequent calls to be blocked by the customer premises equipment 110.

3. It should illicit a response from the customer premises equipment 110. At least, examination of the first byte following the HDLC flag byte in this response will allow the automatic stack determination module 136 to determine which frame mode protocol stack customer premises equipment 110 is running.

An example of such a message would be the Q.921 SAMBE message associated with FUNI. This message is usually transferred in the FUNI address mapping corresponding to the signaling channel. It establishes a link level connection in this channel. The customer premises equipment 110 would have to respond on receipt of the SAMBE message. If a response is received from the customer premises equipment 110, examination of the first byte following the HDLC flag byte will allow the carrier equipment to determine which frame mode protocol stack the customer premises equipment 110 is running. If no response is received after some number of retries, the carrier equipment can assume that the customer premises equipment 110 is running the PPP-ADSL stack. The equivalent message for the PPP stack would be the configure request message.

A combination of the techniques discussed above can be used. Automatic stack determination module 136, once it is determined that customer premises equipment 110 is using frame mode, can wait some amount of time for non-idle frames. If such frames are received, then the particular frame mode being used can be determined. Note: the data used to determine the particular frame mode that customer premises equipment 110 is using should itself be processed after the determination. This will be important, for example, when the customer premises equipment 110 sends some valid protocol message to initialize a particular frame protocol stack. It also allows for seamless protocol processing, so that the message is responded to correctly. If no such frames are received within this time, the automatic stack determination module 136 can time out and then attempt to determine the stack used by its peer across ADSL link 129 via the transfer of a valid message associated with a particular protocol stack, as described above.

To negotiate with the customer premises equipment 110, the following is performed:

1. If the customer premises equipment 110 is using the mode that automatic stack determination module 136 wishes it to use, then automatic stack determination module 136 will use the equivalent framing in the direction of customer premises equipment 110.

2. If automatic stack determination module 136 detects that customer premises equipment 110 is using some other mode, it needs to attempt to make the customer premises equipment 110 change modes. It is assumed that the customer premises equipment 110 reverts to the mode that is signaled by automatic stack determination module 136 if it can do so and wishes to do so. Resource considerations may mean that the customer premises equipment 110 will not switch to the carrier mode even if it supports that mode, however. If automatic stack determination module 136 signals an alternate mode to the customer premises equipment 110, it will assume that the customer premises equipment 110 will revert to this mode within some period of time Y. If the customer premises equipment 110 does not revert to this mode within time, the automatic stack determination module 136 will assume that customer premises equipment 110 does not support this mode, and will revert to the mode customer premises equipment 110 is using.

3. If the customer premises equipment 110 is using frame mode and the automatic stack determination module 136 wishes to switch to cell mode, it will transmit cells to the customer premises equipment 110. If the customer premises equipment 110 is capable of switching to cell mode, it should do so. If it is not capable of making this switch, it should remain in frame mode.

4. If the customer premises equipment 110 is using cell mode and the automatic stack determination module 136 wishes it to switch to frame mode, it will transmit HDLC flags across the ADSL link to the customer premises equipment 110. If the customer premises equipment 110 is capable of switching to frame mode, it should do so. The automatic stack determination module 136 can next use one of three schemes to attempt to get customer premises equipment 110 to use frame mode that the carrier equipment desires:

(a) Automatic stack determination module 136 can proactively signal the specific frame mode that it wishes to use. For example, if the frame mode is PPP-FUNI-ADSL, the automatic stack determination module 136 can transfer Q.921 SAMBE frames across ADSL link 129 using the FUNI address mapping for the signaling channel, and wait for response with a time out/retry mechanism. If the frame mode is PPP-ADSL, automatic stack determination module 136 can send PPP Configure Request packets, and wait for a response (with a time out/retry mechanism). If no response is received, the automatic stack determination module 136 can assume that the customer premises equipment 110 supports or is only willing to use the alternate frame protocol stack. If frames are only received associated with the alternate protocol stack, the conclusion is the same. If no response is received and no frames corresponding to the alternate protocol stack are received, the conclusion is the same. If no response is received and no frames corresponding to the alternate protocol stack are received, automatic stack determination module 136 can double check that the alternate protocol stack is being used by sending the appropriate message and waiting for a response as an option.

(b) As a second alternative, once the customer premises equipment 110 has switched to frame mode, the automatic stack determination module 136 may wait for some time for the customer premises equipment 110 to transfer data frames before proactively signaling the frame mode it wishes to be used as described above. In either case, it will then go through the procedure described in item (a) above.

(c) In a third alternative, automatic stack determination module 136 waits until customer premises equipment 110 transfers data across the link to determine which frame mode the customer premises equipment 110 is using. At that point, if the customer premises equipment 110 is using the frame mode that the carrier equipment wishes to use, it needs to do nothing more. Otherwise, it can send the appropriate message associated with the other frame mode some number of times with some interval Z before concluding that the customer premises equipment does not support the frame mode. It will then fall back to using the other frame mode.

5. It is possible in the case of a race condition and slow processing that both the automatic stack determination module 136 and customer premises equipment 110 will change to a different mode concurrently. For example, suppose that the customer premises equipment 110 is using cell mode. The automatic stack determination module 136 signals to use frame mode. The automatic stack determination module 136, monitoring the ADSL link 129, determines that the customer premises equipment 110 cannot use frame mode and changes to cell mode. The customer premises equipment 110 changes to frame mode as well. For this case, once the customer premises equipment 110 has made a switch to a particular mode once, it stays in that mode. The automatic stack determination module 136 will realize that the customer premises equipment 110 has made the switch, and switches back to frame mode. The same approach can be used for negotiating a particular frame mode to be used.

Figure 3A:
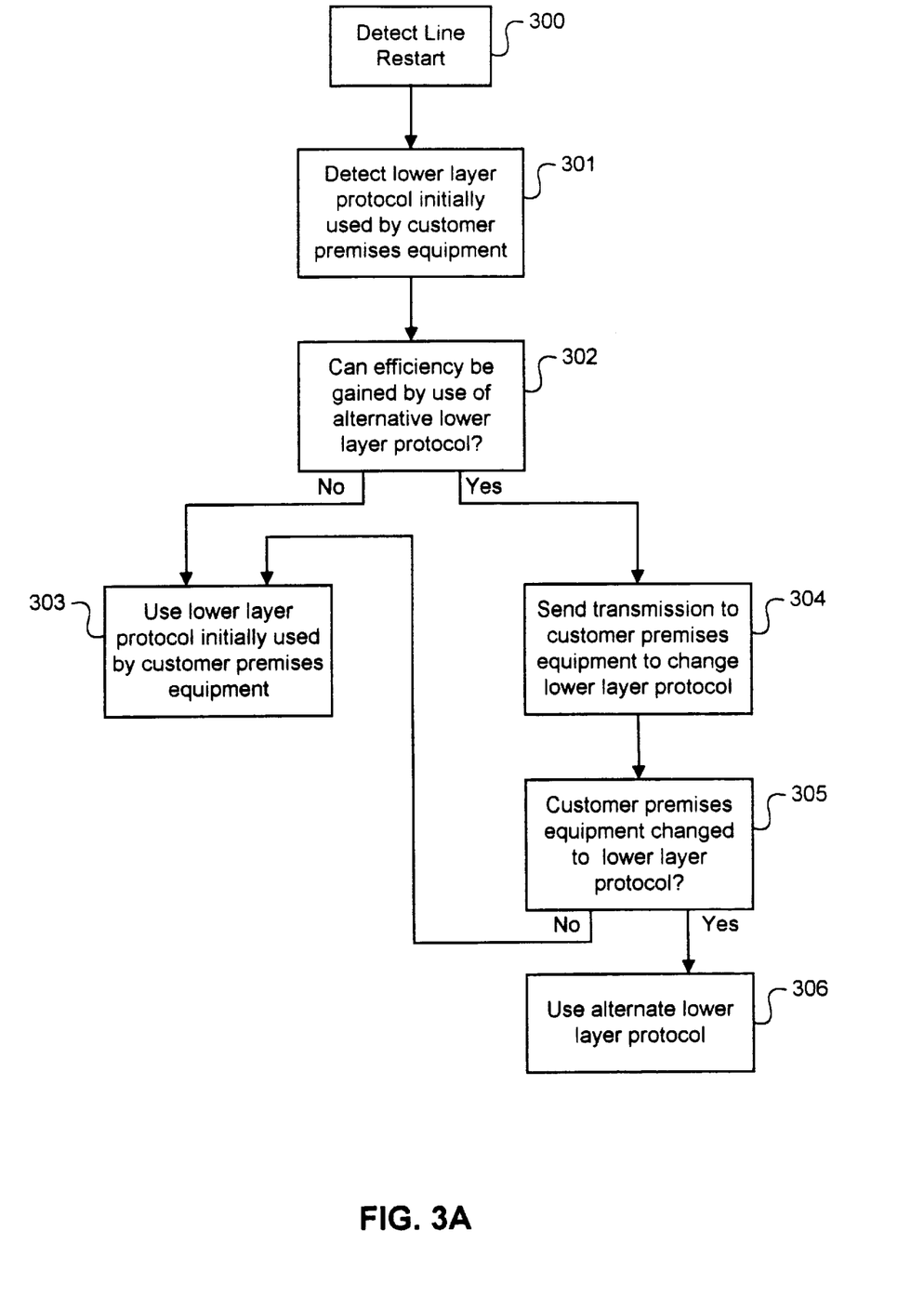
FIG. 3(a) is a flow chart illustrating an method of automatically configuring a link according to an embodiment of the present invention.

FIG. 3(a) is a flow chart illustrating a method of automatically configuring a link according to an embodiment of the present invention. First, automatic stack determination module 136 initiates by detecting a line restart on the ADSL link 129 (block 300). Automatic stack determination module 136 detects the lower layer protocol initially used by customer premises equipment 110 (block 301). The automatic stack determination module 136 determines whether efficiencies can be gained by the use of an alternative lower layer protocol (block 302). If no efficiencies can be gained, then the automatic stack determination module 136 will cause the central office equipment 130 to use on the ADSL link 129 the lower layer protocol initially used by the customer premises equipment 110 (block 303). For example, the customer premises equipment 100 may initially use the PPP layer and ATM layer as shown in layers 116 and 117 of protocol stack 113 on FIG. 1(a). If protocol stack 113 (ATM-based) were initially used by customer premises equipment 110, then efficiencies would not be gained by switching to another protocol stack because access multiplexer 135 is coupled to ATM backbone network 137. In an embodiment of the invention, when a particular lower layer protocol is used on ADSL link 129, then that means that a stack including that protocol is used on the link. Thus, the protocol stack 113 and backbone network 137 both use the cell-based ATM protocol as a lower level protocol.

If efficiencies can be gained by use of an alternative lower layer protocol, then send a message to customer premises equipment 110 to change the lower layer protocol (block 304). For example, if in FIG. 1(a) initially protocol stack 114 (frame-based), is used by customer premises equipment 110, and backbone network 137 is an ATM cell-based protocol stack, a more efficient lower layer protocol would be a cell-based protocol for the ADSL link 129. Thus automatic stack determination module 136 would signal customer premises equipment 110 to change to protocol stack 113, which includes ATM layer 117 (cell-based). Auto stack determination module 136 checks to determine whether customer premises equipment 110 has changed lower layer protocols (block 305). If customer premises equipment 110 has not changed lower layer protocols, then automatic stack determination module 136 uses on ADSL link 129 the lower layer protocol initially used by customer premises equipment 110 (block 303). If customer premises equipment 110 changes lower layer protocols, then automatic stack determination module 136 uses the alternate lower layer protocol (block 306). For example, as in FIG. 1(*a*), if backbone network 137 is an ATM cell-based network, and automatic stack determination module 136 signals customer premises equipment 110 to use protocol stack 113 and customer premises equipment 110 does change to protocol stack 113, then this protocol stack including the ATM lower layer protocol is used.

FIGS. 3(*b*) and (c) is a more detailed flow chart showing a method of detecting the lower layer protocol used by the customer premises equipment according to the present invention. Initially a timer is started in order to provide a time out period during which to observe the bit stream from customer premises equipment 110 (block 320). The bit stream from customer premises equipment 110 is observed by automatic stack determination module 136 (block 321). Under this scheme, either a message has been sent to customer premises equipment 110 to cause customer premises equipment 110 to respond with a message in that particular protocol, or a restart has occurred and automatic stack determination module 136 is waiting for the bit stream from customer premises equipment 110. If ATM cells are received for a period X, then automatic stack determination module 136 determines that customer premises equipment is using an ATM protocol (block 322). The ATM cells are observed over a period X, to account for a case in where a reception of a bit stream which appears as ATM cells is actually some other protocol.

Figure 3B:
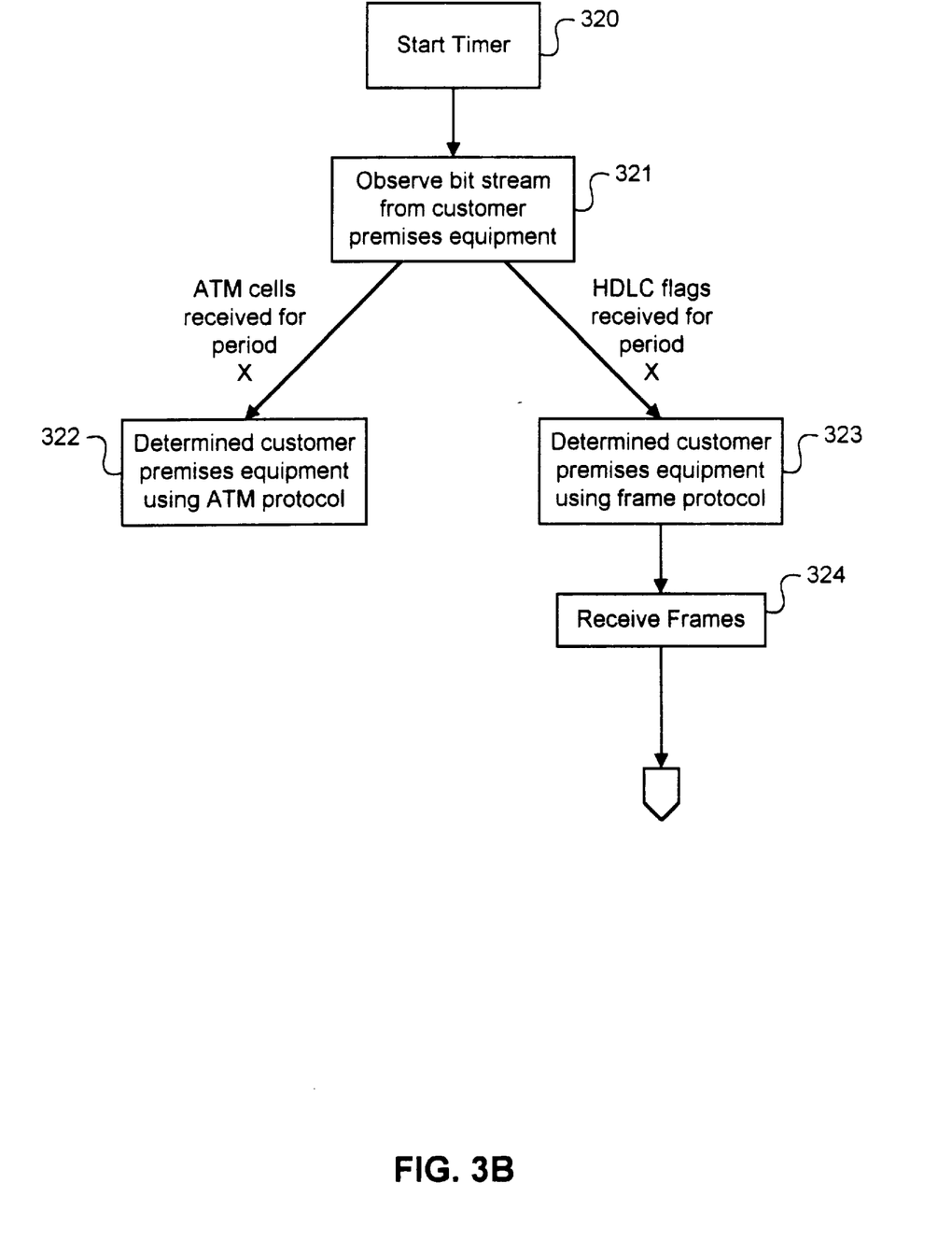
FIGS. 3(b) and (c) is a more detailed flow chart showing a method of detecting the lower layer protocol used by the customer premises equipment according to an embodiment of the present invention.
Figure 3C:
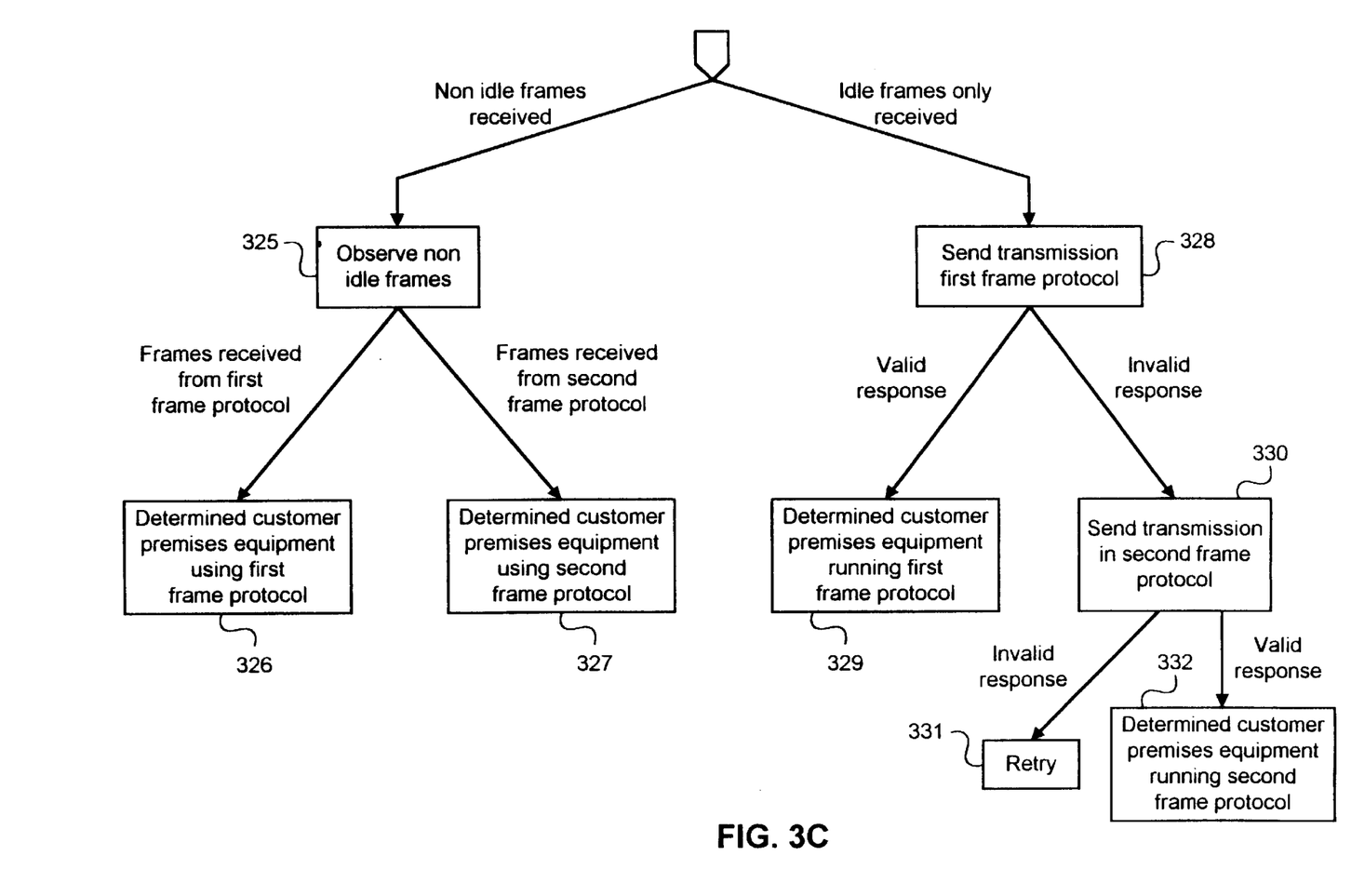

If HDLC flags are received for a period X, then automatic stack determination module 136 determines that customer premises equipment are using a frame-based protocol (block 323). The flags are received for a period X in order to account for a misidentification of a non-HDLC bit stream as an HDLC flag. The frames are received (block 324). If non-idle frames are received, then the non-idle frames are observed (block 325). The non-idle frames are analyzed to determine whether they belong to a first frame protocol or a second frame protocol. If the non-idle frames are from the first frame protocol, then it is determined that customer premises equipment 110 is using the first frame protocol (block 326). If the frames are received from the second frame protocol, then it is determined that the customer premises equipment 110 is using the second frame protocol (block 327). When only idle frames are received, it cannot be determined whether the frames belong to the first frame protocol or the second frame protocol.

As noted above, the different frame protocols cannot be distinguished based on idle frames. Thus, when only idle frames are received, automatic stack determination module 136 sends a test transmission from the first frame protocol (block 328). If a valid response is received to the transmission from the first frame protocol, then it is determined that the customer premises equipment is running the first frame protocol (block 329). If an invalid response is received to the test transmission from the first frame protocol, then test transmission from the second protocol is sent to the customer premises equipment (block 330). If an invalid response is received, then the automatic stack determination module 136 causes a retry (block 331). Alternatively, a time out or other error state may be entered. If a valid response to the transmission from the second frame protocol is received, then it is determined that the customer premises equipment is running the second frame protocol (block 332).

FIG. 3(*d*) is a flow chart illustrating a method of negotiating a lower level protocol to be used on a link between customer premises equipment and the central office. First, the automatic stack determination module 136 determines whether the customer premises equipment 110 is using the desired protocol (block 340). If the customer premises equipment 110 is using the desired protocol, then automatic stack determination module 136 causes that protocol to be used on the link (block 341).

Figure 3D:
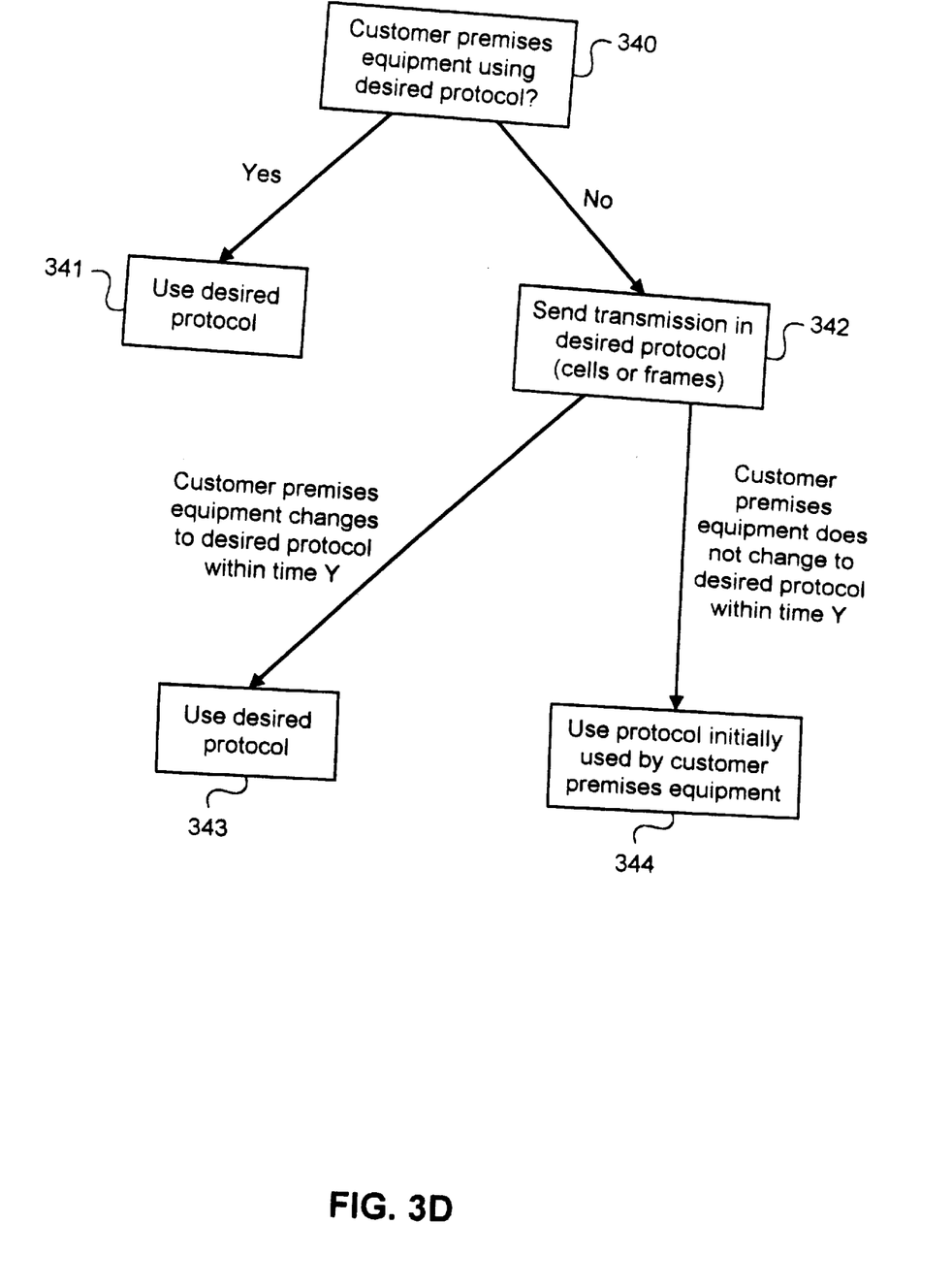
FIG. 3(d) is a flow chart illustrating a method of negotiating a lower level protocol to be used on a link between customer premises equipment and the central office according to an embodiment of the present invention.

If the customer premises equipment 110 is not using the desired protocol, then the automatic stack determination module 136 sends a message in the desired protocol (cells or frames) to the customer premises equipment 110 (block 342). For example, if the backbone network is a cell-based network, and the customer premises equipment is initially using a frame-based protocol, then a message is sent in a cell-based protocol to the customer premises equipment 110 in order to attempt to cause the customer premises equipment 110 to change to a cell-based protocol. If the customer premises equipment 110 reverts to the desired protocol within the time Y, then the automatic stack determination module 136 causes the desired protocol to be used on the ADSL link 129 (block 343). If the customer premises equipment does not revert to the desired protocol within a period of time Y, then the automatic stack determination module 136 causes the ADSL link 129 to use the protocol initially used by the customer premises equipment 110 (block 344).

Figure 4:
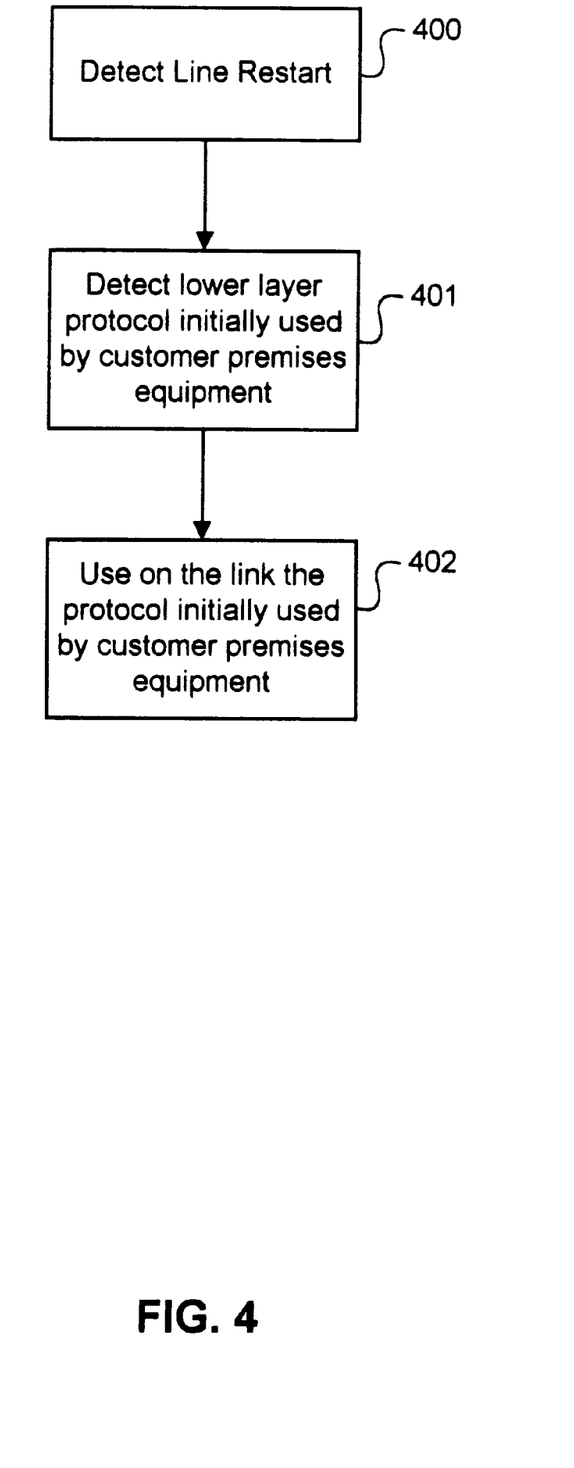
FIG. 4 is a flow chart illustrating a method automatically configuring a link between customer premises equipment and a central office according to an embodiment of the present invention.

FIG. 4 is a flow chart illustrating a method automatically configuring a link between customer premises equipment and a central office according to an embodiment of the present invention. As an alternative to a system in which the automatic stack determination module attempts to cause the customer premises equipment 110 to choose a protocol that is more efficient than the one initially chosen, the automatic stack determination module may select the protocol initially used by the customer premises equipment 110. First, the automatic stack determination module 136 detects a line restart (block 400). The automatic stack determination module 136 detects the lower layer protocol initially used by the customer premises equipment (block 401). Then, the automatic stack determination module 136 uses on the link the protocol initially used by the customer premises equipment (block 402).

Accordingly, the present invention provides a method of automatically configuring a link between an end station and an intermediate device that is coupled to a portion of a network. One embodiment involves automatically determining the protocol used by the end station thus making configuration relatively easy. Another embodiment involves negotiating with the end station to use a protocol that has a particular relationship with the protocol used by the portion of the network. One advantage of choosing a protocol having a particular relation is that the protocol can be chosen to bring about efficiencies in transmission over the link and through the backbone network.

The foregoing description of embodiments of the invention has been presented for the purposes of illustration and description. It is not intended to be exhaustive or to limit the invention to the precise form disclosed. Many modifications and variations will be apparent to practitioners skilled in the art. It is intended that the scope of the invention be defined by the following claims or their equivalents.

What is claimed is:

1. In a network including an end station, an intermediate device coupled to the end station, and a portion of a network coupled to the intermediate device, the end station and the intermediate device communicating through a link using a point-to-point protocol, the end station initially using a first lower layer protocol, the intermediate device being capable of translating between the first lower layer protocol initially used by the endstation and a second lower layer protocol used by the portion of a network, a method of automatically configuring the link, the method comprising:

signaling the end station to use on the link a third lower layer protocol having a particular relationship with the second lower layer protocol used by the portion of a network;

if the end station changes to the third lower layer protocol having the particular relationship with the second lower layer protocol used by the portion of the network, then using on the link the third lower layer protocol having the particular relationship with the second lower layer protocol used by the portion of the network; and if the end station does not change to the third lower layer protocol having the particular relationship with the second lower layer protocol used by the portion of the network, then using on the link the first lower layer protocol initially used by the end station.

2. The method of claim 1, wherein the particular relationship comprises that the third lower layer protocol that the end station is signaled to use on the link is the same as the second lower layer protocol used by the portion of a network.

3. The method of claim 1, wherein the third lower layer protocol having the particular relationship with the second lower layer protocol used by the portion of the network comprises a protocol that improves transmission efficiency from the end station through the portion of the network relative to transmission efficiency using on the link the first lower layer protocol initially used by the end station.

4. The method of claim 3, wherein the efficiency is achieved by reducing reformatting of data at the intermediate device.

5. The method of claim 3, wherein the second lower layer protocol used by the portion of the network comprises a protocol including fixed-length packets and the third lower layer protocol having the particular relationship with the lower layer protocol used by the portion of the network comprises a protocol including fixed-length packets.

6. The method of claim 5, wherein the second lower layer protocol used by the portion of the network comprises an asynchronous transfer mode (ATM) protocol.

7. The method of claim 3, wherein the second lower layer protocol used by the portion of the network comprises a protocol including variable-length packets and the third lower layer protocol having the particular relationship with the second lower layer protocol used by the portion of the network comprises a protocol including variable-length packets.

8. The method of claim 7, wherein the second lower layer protocol used by the portion of the network comprises a frame based user to network interface (FUNI) protocol.

9. The method of claim 7, wherein the second lower layer protocol used by the portion of the network comprises a high level data link control (HDLC) protocol that does not include a FUNI protocol.

10. The method of claim 1, wherein the first lower layer protocol initially used by the end station comprises a frame-based protocol and wherein the second lower layer protocol used by the portion of a network comprises a cell-based protocol.

11. The method of claim 10, wherein the third lower layer protocol having the particular relationship with the second lower layer protocol used by the portion of the network comprises a cell-based protocol.

12. The method of claim 10, wherein the first lower layer protocol initially used by the end station comprises a FUNI protocol and wherein the second lower layer protocol used by the portion of a network comprises an ATM protocol.

13. The method of claim 10, wherein the first lower layer protocol initially used by the end station comprises an HDLC protocol that does not include a FUNI protocol and wherein the second lower layer protocol used by the portion of a network comprises an ATM protocol.

14. The method of claim 12, wherein the third lower layer protocol having the particular relationship with the second lower layer protocol used by the portion of the network comprises an ATM protocol.

15. The method of claim 1, wherein the first lower layer protocol initially used by the end station comprises a frame-based protocol and wherein the second lower layer protocol used by the portion of a network comprises a cell-based protocol.

16. The method of claim 15, wherein the third lower layer protocol having the particular relationship with the second lower layer protocol used by the portion of the network comprises a cell-based protocol.

17. The method of claim 15, wherein the first lower layer protocol initially used by the end station comprises a frame based user to network interface (FUNI) protocol and wherein the second lower layer protocol used by the portion of a network comprises an asynchronous transfer mode (ATM) protocol.

18. The method of claim 15, wherein the first lower layer protocol initially used by the end station comprises an HDLC protocol that does not include a FUNI protocol and wherein the second lower layer protocol used by the portion of a network comprises an asynchronous transfer mode (ATM) protocol.

19. The method of claim 17, wherein the third lower layer protocol comprises an ATM protocol.

20. The method of claim 1, wherein the first lower layer protocol initially used by the end station includes one of:
a frame-based protocol, and
a cell-based protocol.

21. The method of claim 20, wherein the second lower layer protocol used by the network comprises a cell-based protocol.

22. The method of claim 1, wherein the signaling comprises the intermediate device sending to the end station a transmission formatted according to the third lower layer protocol.

23. In a network including a first end station, an intermediate device coupled to the end station, and a portion of a network coupled to the intermediate device, the end station and the intermediate device communicating through a link using a point-to-point protocol and a first lower layer protocol, the intermediate device being capable of translating between the first lower layer protocol used by the link and a second lower layer protocol used by the portion of a network, a method of automatically configuring the link, the method comprising:

at the intermediate device detecting the first lower layer protocol used by the end station; and configuring the link to use the point-to-point protocol, the first lower layer protocol used by the end station, and an asymmetric digital subscriber line (ADSL) protocol;

signaling the end station to use on the link a third lower layer protocol having a particular relationship with the third lower layer protocol used by the portion of a network.

24. The method of claim 23, wherein detecting comprises:

determining that the end station uses a particular lower layer protocol if a bit stream received from the end station includes a transmission encoded according to the particular lower layer protocol.

25. The method of claim 23, wherein detecting comprises:

determining that the end station uses a particular lower layer protocol if a bit stream received from the end station includes a transmission encoded according to the particular lower layer protocol for a particular period.

26. The method of claim 25, wherein the particular period comprises a period greater than one in which 10 data packets according to the particular lower layer protocol can be received.

27. The method of claim 23, wherein detecting comprises:

if a particular number of ATM cells are received from the end station, determining that the lower layer protocol used by the end station is an ATM protocol.

28. The method of claim 27, wherein the particular number is greater than 10.

29. The method of claim 23, wherein detecting comprises:

if a particular number of high level data link control (HDLC) frames are received from the end station, determining that the first lower layer protocol used by the end station is a frame-based protocol.

30. The method of claim 23, comprising:

before detecting the first lower layer protocol used by the end station, the intermediate device sending to the end station a transmission formatted according to a particular lower layer protocol.

31. The method of claim 23, comprising:

after detecting the first lower layer protocol used by the end station, the intermediate device sending to the end station a transmission formatted according to a particular lower layer protocol to further determine the first lower layer protocol used by the end station.

32. The method of claim 31, wherein the first lower layer protocol used by the end station comprises a frame-based protocol and the particular lower layer protocol comprises a particular type of frame-based protocol.

33. The method of claim 32, wherein the particular type of frame-based protocol comprises a FUNI protocol, and detecting comprises determining that the end station uses a FUNI protocol if a valid FUNI response to the transmission is received.

34. The method of claim 33, wherein the transmission comprises Q.921 SABME frames.

35. The method of claim 33, comprising determining that the end station uses a point-to-point protocol directly on an ADSL protocol if a valid response to the transmission is not received within a particular period.

36. The method of claim 32, wherein the particular type of frame-based protocol comprises a point-to-point protocol directly on an ADSL protocol, and detecting comprises determining that the end station uses the point-to-point protocol directly on an ADSL protocol if a valid response according the point-to-point protocol directly on an ADSL protocol to is received.

37. The method of claim 36, wherein the transmission comprises Configure Request packets according to a point-to-point protocol directly on an ADSL protocol.

38. The method of claim 31, wherein the transmission does not trigger an operation in the end station other than a response from the end station.

39. The method of claim 38, wherein the transmission is formatted according to the particular lower layer protocol.

40. The method of claim 38, wherein the transmission is not formatted according to the particular lower layer protocol.

41. The method of claim 31, wherein the transmission causes a response from the end station.

42. The method of claim 41, wherein the transmission is formatted according to the particular lower layer protocol.

43. The method of claim 41, wherein the transmission is not formatted according to the particular lower layer protocol.

44. The method of claim 38, wherein the transmission causes a response from the end station.

45. The method of claim 44, wherein the transmission is formatted according to the particular lower layer protocol.

46. The method of claim 44, wherein the transmission is not formatted according to the particular lower layer protocol.

47. In a network including a first end station, an intermediate device coupled to the end station, and a portion of a network coupled to the intermediate device, the end station and the intermediate device communicating through a link using a point-to-point protocol, the end station initially using a first lower layer protocol, the intermediate device being capable of translating between the first lower layer protocol initially used by the link and a second lower layer protocol used by the portion of a network, a method of automatically configuring the link, the method comprising:

at the intermediate device detecting the first lower layer protocol initially used by the end station; and if the first lower layer protocol initially used by the end station has a particular relationship with the second lower layer protocol used by the portion of a network, then using on the link the first lower layer protocol initially used by the end station, else signaling the end station to use on the link a third lower layer protocol having a particular relationship with the second lower layer protocol used by the portion of a network, if the end station changes to the third lower layer protocol, then using on the link the third lower layer protocol, and if the end station does not change to the third lower layer protocol, then using on the link the first lower layer protocol initially used by the end station.

48. The method of claim 47, comprising configuring the link to use an asymmetric digital subscriber line (ADSL) protocol.

49. The method of claim 47, wherein the third lower layer protocol comprises a protocol that improves transmission efficiency from the end station through the portion of the network relative to transmission efficiency using on the link the first lower layer protocol initially used by the end station.

50. The method of claim 47, wherein the first lower layer protocol initially used by the end station comprises a frame-based protocol and wherein the second lower layer protocol used by the portion of a network comprises a cell-based protocol.

51. The method of claim 50, wherein the first lower layer protocol initially used by the end station comprises a frame based user to network interface (FUNI) protocol and wherein the second lower layer protocol used by the portion of a network comprises an asynchronous transfer mode (ATM) protocol.

52. The method of claim 50, wherein the first lower layer protocol initially used by the end station comprises an HDLC protocol that does not include a FUNI protocol and wherein the second lower layer protocol used by the portion of a network comprises an asynchronous transfer mode (ATM) protocol.

53. The method of claim 51, wherein the third lower layer protocol having the particular relationship with the second lower layer protocol used by the portion of the network comprises an ATM protocol.

54. The method of claim 47, wherein detecting comprises:
if a particular number of ATM cells are received from the end station, determining that the first lower layer protocol used by the end station is an ATM protocol.

55. The method of claim 54, wherein the particular number is greater than 10.

56. The method of claim 47, wherein detecting comprises:
if a particular number of high level data link control (HDLC) frames are received from the end station, determining that the first lower layer protocol used by the end station is a frame-based protocol.

57. The method of claim 47, comprising:
before detecting the first lower layer protocol used by the end station, the intermediate device sending to the end station a transmission formatted according to a particular lower layer protocol.

58. The method of claim 47, comprising:
after detecting the first lower layer protocol used by the end station, the intermediate device sending to the end station a transmission formatted according to a particular lower layer protocol to further determine the first lower layer protocol used by the end station.

59. The method of claim 58, wherein the first lower layer protocol used by the end station comprises a frame-based protocol and the particular lower layer protocol comprises a particular type of frame-based protocol.

60. The method of claim 59, wherein the particular type of frame-based protocol comprises a FUNI protocol, and detecting comprises determining that the end station uses a FUNI protocol if a valid FUNI response to the transmission is received.

61. The method of claim 60, wherein the transmission comprises Q.921 SABME frames.

62. The method of claim 60, comprising determining that the end station uses a point-to-point protocol directly on an ADSL protocol if a valid response to the transmission is not received within a particular period.

63. The method of claim 59, wherein the particular type of frame-based protocol comprises a point-to-point protocol directly on an ADSL protocol, and detecting comprises determining that the end station uses the point-to-point protocol directly on an ADSL protocol if a valid response according the point-to-point protocol directly on an ADSL protocol to is received.

64. The method of claim 63, wherein the transmission comprises Configure Request packets according to a point-to-point protocol directly on an ADSL protocol.

65. The method of claim 58, wherein the transmission does not trigger an operation in the end station other than a response from the end station.

66. The method of claim 65, wherein the transmission is formatted according to the particular lower layer protocol.

67. The method of claim 65, wherein the transmission is not formatted according to the particular lower layer protocol.

68. The method of claim 58, wherein the transmission causes a response from the end station.

69. The method of claim 68, wherein the transmission is formatted according to the particular lower layer protocol.

70. The method of claim 68, wherein the transmission is not formatted according to the particular lower layer protocol.

71. The method of claim 65, wherein the transmission causes a response from the end station.

72. The method of claim 71, wherein the transmission is formatted according to the particular lower layer protocol.

73. The method of claim 71, wherein the transmission is not formatted according to the particular lower layer protocol.

74. An access multiplexer in a central office for providing a connection between a portion of a network and a link to an end station, the link using a first lower layer protocol, the access multiplexer comprising a module that
translates between the first lower layer protocol used by the link and a second lower layer protocol used by the portion of the network;
signals the end station to use on the link a third lower layer protocol having a particular relationship with the second lower layer protocol used by the portion of the network;
if the end station changes to the third lower layer protocol, then using on the link the third lower layer protocol; and
if the end station does not change to the third lower layer protocol, then using on the link the first lower layer protocol initially used by the end station.

75. The method of claim 74, wherein the particular relationship comprises that the third lower layer protocol that the end station is signaled to use on the link is the same as the second lower layer protocol used by the portion of a network.

76. The method of claim 74, wherein the third lower layer protocol comprises a protocol that improves transmission efficiency from the end station through the portion of the network relative to transmission efficiency using on the link the first lower layer protocol initially used by the end station.

77. The method of claim 76, wherein the second lower layer protocol used by the portion of the network comprises a protocol including fixed-length packets and the third lower layer protocol comprises a protocol including fixed-length packets.

78. The method of claim 77, wherein the second lower layer protocol used by the portion of the network comprises an asynchronous transfer mode (ATM) protocol.

79. The method of claim 76, wherein the second lower layer protocol used by the portion of the network comprises a protocol including variable-length packets and the third lower layer protocol comprises a protocol including variable-length packets.

80. The method of claim 79, wherein the second lower layer protocol used by the portion of the network comprises a frame based user to network interface (FUNI) protocol.

81. The method of claim 79, wherein the second lower layer protocol used by the portion of the network comprises an HDLC protocol that does not include a FUNI protocol.

82. The method of claim 74, wherein the first lower layer protocol initially used by the end station comprises a frame-based protocol and wherein the second lower layer protocol used by the portion of a network comprises a cell-based protocol.

83. The method of claim 82, wherein the third lower layer protocol comprises a cell-based protocol.

84. The method of claim 82, wherein the first lower layer protocol initially used by the end station comprises a FUNI protocol and wherein the second lower layer protocol used by the portion of a network comprises an ATM protocol.

85. The method of claim 84, wherein the third lower layer protocol comprises an ATM protocol.

86. The method of claim 74, wherein the first lower layer protocol initially used by the end station comprises a frame-based protocol and wherein the second lower layer protocol used by the portion of a network comprises a cell-based protocol.

87. The method of claim 86, wherein the third lower layer protocol comprises a cell-based protocol.

88. The method of claim 86, wherein the first lower layer protocol initially used by the end station comprises a frame based user to network interface (FUNI) protocol and wherein the second lower layer protocol used by the portion of a network comprises an asynchronous transfer mode (ATM) protocol.

89. The method of claim 86, wherein the first lower layer protocol initially used by the end station comprises an HDLC protocol that does not include a FUNI protocol and wherein the second lower layer protocol used by the portion of a network comprises an asynchronous transfer mode (ATM) protocol.

90. The method of claim 88, wherein the third lower layer protocol comprises an ATM protocol.

\* \* \* \* \*